Figure 1:
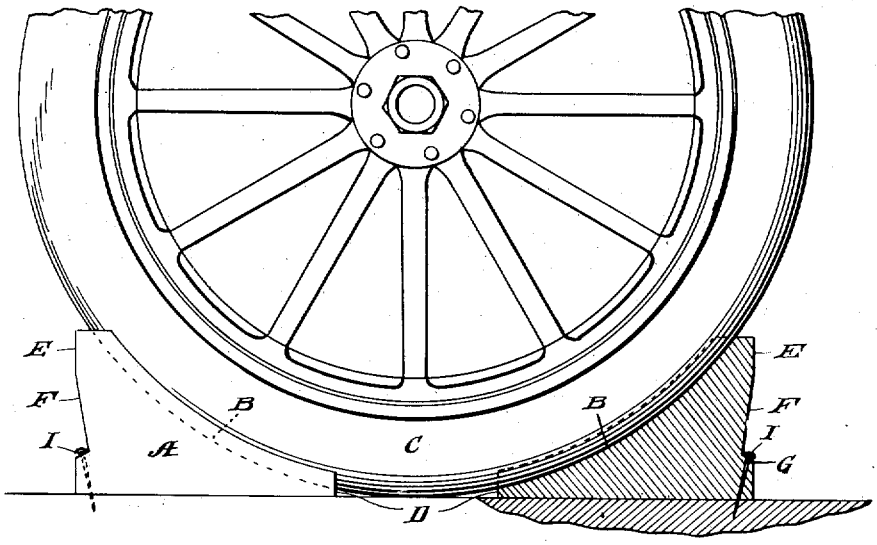

E. S. EVANS.

CHOCK BLOCK.

APPLICATION FILED APR. 18, 1917.

Reissued May 29, 1917. 14,306.

Inventor

E. S. Evans

By

Attorney

UNITED STATES PATENT OFFICE.

EDWARD S. EVANS, OF DETROIT, MICHIGAN.

CHOCK-BLOCK.

14,306. Specification of Reissued Letters Patent. Reissued May 29, 1917.

Original No. 1,188,745, dated June 27, 1916, Serial No. 72,903, filed January 19, 1916. Application for reissue filed April 18, 1917. Serial No. 163,069.

*To all whom it may concern:*

Be it known that I, EDWARD S. EVANS, a citizen of the United States, residing at Detroit, in the county of Wayne, in the State of Michigan, have invented certain new and useful Improvements in Chock-Blocks, of which the following is a specification.

This invention relates to certain new and useful improvements in chock-blocks, particularly such as are used for securing vehicles, such as automobiles, in fixed position in cars during shipment thereof.

In the shipping of vehicles, particularly automobiles, it is now the universal practice to ship the same in built-up condition, and it is necessary to so secure the same in the car in which they are shipped, that they shall withstand the jarring and "bumping" to which the car is subjected, that the automobile may not be damaged or damage other automobiles in the same car by movement back and forth in the car in which it is placed.

The matter of providing an effective means of securing the automobile against such movement in the car in which it is shipped, which means shall at the same time not be so expensive as to prohibit its use, has become a serious question with the manufacturers of automobiles. The work incident to loading automobiles in cars for shipment is usually performed by unskilled labor, and it has been found necessary to provide a securing means for the automobile which even the most unskilled workman can understand and properly apply, and which, after the same is placed in its "holding" position, can be easily secured to the floor of the freight car in which the automobile is placed without danger of damaging the chock-block, and at the same time insuring the firm securing of such block.

It is the primary object of my invention therefore, to provide a chock-block of extreme simplicity, rendering it easy to position in its locking or holding position, a chock-block extremely cheap to manufacture, and a chock-block so constructed that the means such as nails, screws, or spikes or the like employed for fastening the same to the car floor may be easily driven in a manner to insure their proper engagement with the car floor and the resultant effective securing of the chock-block in position.

Specific embodiments by which the desired results of my invention are attained may be varied, but my invention broadly consists in providing the chock-block with an incut in the rear face thereof so made as to form a heel or ledge, providing a portion of the block through which the block securing means are driven. This incut is so formed as to in no wise weaken the block, and in addition to forming a heel or ledge for the reception of the securing means, provides a clearance at the rear face of the block so that the securing means can be readily driven in a manner to insure their proper entry into the car floor on which the block is placed.

Chosen embodiments of my invention are herein shown, and will be described in detail, without however, limiting myself to the specific embodiments so shown and described, it being understood that my invention broadly contemplates the provision of any incut or ledge at the rear face of the chock-block for the purposes stated above.

Figure 2:
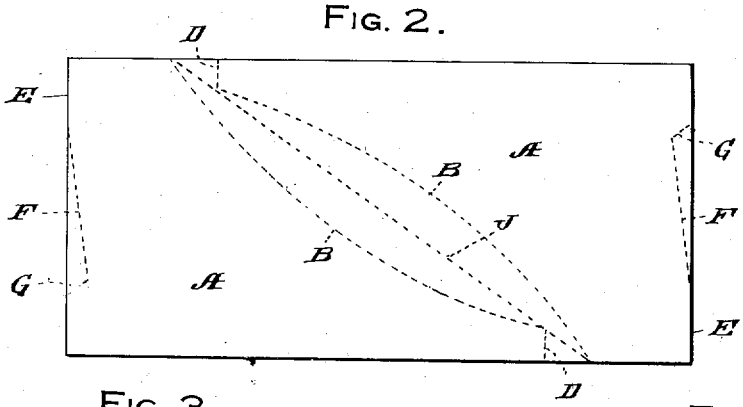
Figure 3:
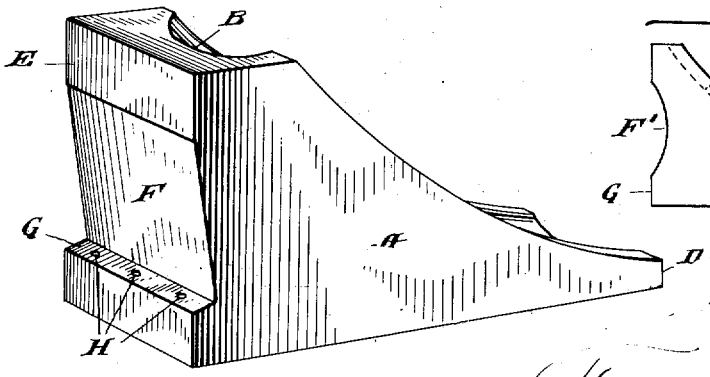
Figure 4:
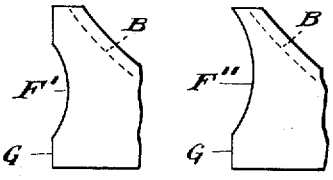

In the accompanying drawings, Figure 1 is a view in side elevation of a part of an automobile wheel, showing two chock-blocks in accordance with my invention for securing the wheel, one of the blocks being shown in side elevation, and the other in longitudinal section. Fig. 2 is a developed plan view of the method of manufacture of the blocks, illustrating how two blocks are formed from a single piece of wood of the required dimensions of rectangular form. Fig. 3 is a detail perspective view of a chock block of the preferred form of construction, and, Fig. 4 shows different forms of incuts for providing the heel or ledge on the blocks.

A chock-block in accordance with my invention is preferably formed of wood. In manufacture, I am enabled to take short ends or lengths of logs or timbers of relatively sound nature, but which, owing to their lengths may not be worked into other merchantable lumber. The timbers are sawed into lengths of generally rectangular form in cross-section from which two blocks may be produced.

The block designated generally as A, is preferably formed of a length somewhat exceeding its height at the highest point, and of a width or thickness which will give the block a secure purchase upon the floor or other base, and also permit of the grooving of the one face of the block without a weakening of the same.

The wheel-engaging face of the chock-block is preferably cut on an arc to conform to the curve or arc of a tire, and this curved or arc-face in the embodiment here shown, is provided throughout its length with a groove B that is adapted to neatly receive the tire C of the wheel as shown in Fig. 1. It is preferable, though not essential to the operation, that the small or forward end of the chock-block be cut off blunt as shown at D. This is preferable for the reason that it does not in any way interfere with the proper operation of the block, and it prevents danger of the block splitting, due to the rough handling it receives in shipment before being used; also it obviates any danger of splinters or fins on the feather end of the block, which might injure the rubber tire of the wheel to which the block is applied. As stated, the embodiment herein shown has the wheel-engaging face cut on an arc and also grooved to receive the tire. This, however, is but illustrative, the invention involved being the provision of a heel or ledge at the rear of the block for a purpose as will now be described.

On the rear face E of the chock-block, I make an incut so formed as to produce a ledge or heel G, on the rear face of the block adjacent the base thereof. This incut may be formed as shown at F in Figs. 1, 2 and 3, or it may be of other forms as shown at F′ and F″, in Fig. 4, or other styles of incut may be made, the form of the incut being immaterial, so long as the completed block contains the clearance produced by the incuts shown, and the heel or ledge G.

In the forms herein shown and described, it is to be noted that the rear face of the block, below the ledge is in the same vertical plane as the rear face of the block at the upper end of the incut. Obviously, I do not confine myself to this specific construction, as, should the incut be extended through the top of the block as at F″, Fig. 4, the rear face of the block below the ledge might project slightly beyond the rear face of the block at the upper end of the latter. Also, should the incut be extended down to the base of the block after forming the ledge, the rear face of the block below the ledge would be inside the vertical plane of the rear face of the block above the incut.

The most practical form of this incut is, however, shown in Fig. 3, starting at a point below the upper face of the block on the rear face and extending downwardly and inwardly to a point near the base of the block, and then downwardly and outwardly to the outer face of the block. This produces the heel, and presents the upper face thereof at such an inclination as to permit of the ready driving of the spikes or nails, the clearance afforded by the incut permitting the operator to readily drive such nails, spikes or other fastening means without difficulty. If desired, holes H may be made through the heel at the proper angle, but owing to the angle at which the ledge is presented, it has been found that the nails I or other fastening devices may be easily and readily driven where no holes are provided in the heel.

The starting of the incut at a point below the upper face of the block has an additional advantage in that the top portion of the block is left intact and of considerable thickness, decreasing to a minimum, its liability to crack or split either under weather conditions or rough handling in shipment.

The providing of the incut and the heel or ledge overcomes the objection to a block of this general character having a straight back or face, in that with such straight back or face, it is extremely difficult to drive the securing nails or spikes in a manner to effectively secure the block, the nails or spikes oftentimes being driven at an angle so near to the vertical as to cause them to split the block, and at other times being driven at such angle so near to the horizontal as to cause them to turn in between the floor and the base of the block with the result that the chock-block would work loose due to the bumping and jarring of the freight cars. With my invention this is entirely overcome, the nails being as readily accessible for driving as in any flat surface, and they are insured of being driven in such manner as to take effective hold with the floor of the car.

Particular attention is directed to the fact that by providing the heel by making an incut in the rear face of the block, the rear face of the heel is in the same vertical plane as the rear face of the block above the point where the incut begins. Thus, there is no part of the rear face of the block projecting, but the entire block, when the latter is positioned as shown in Fig. 1 lies well within the maximum tire diameter. This is important, as in the shipment of automobiles, it frequently happens where two automobiles are placed tandem in a car, that the front wheels or tires of one automobile are practically touching the rear wheels or tires of the other car, so that any projecting portion on the rear face of the block prevents the proper positioning of the blocks for each car.

By taking a piece of material of sufficient size to make two chock-blocks as shown in Fig. 2, the blocks are manufactured with an extremely small amount of waste material, as such piece of material is first cut through diagonally on the line J into two sections or pieces from each of which a complete block is formed as will be obvious. The waste is in this manner reduced to a minimum, an important desideratum, as it is to be understood that blocks for this purpose are employed but one time, being removed and thrown away when the automobile reaches its destination. The incut while in no wise weakening the block, somewhat reduces the weight thereof, and thus provides also a saving in the shipment of the blocks to the point where they are to be used.

What I claim as new is:—

1. A chock-block having a plurality of faces, one of said faces having an incut terminating short of the base of the block whereby a heel or ledge is formed adjacent the base, said heel or ledge adapted to receive fastening means to secure the block to a support and one of said faces being a wheel engaging face.

2. A chock-block having a wheel-engaging face and having an incut in the rear face, the incut being so formed as to provide a heel on the block near the lower end of said rear face, the heel and incut providing a face to receive fastening means to secure the block to a support, the rear face of the heel and the rear face of the block above the incut being in the same vertical plane.

In testimony whereof, I affix my signature.

EDWARD S. EVANS.

Copies of this patent may be obtained for five cents each, by addressing the "Commissioner of Patents, Washington, D. C."